United States Patent
Kawaguchi

(10) Patent No.: US 6,360,312 B1
(45) Date of Patent: Mar. 19, 2002

(54) PROCESSOR FOR MAKING MORE EFFICIENT USE OF IDLING COMPONENTS AND PROGRAM CONVERSION APPARATUS FOR THE SAME

(75) Inventor: Kenichi Kawaguchi, Kobe (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/280,363

(22) Filed: Mar. 29, 1999

(30) Foreign Application Priority Data

Mar. 30, 1998 (JP) .......................................... 10-083369

(51) Int. Cl.$^7$ ............................................. G06F 15/00
(52) U.S. Cl. ........................ 712/215; 712/210; 712/212
(58) Field of Search ............................... 712/214–216, 712/210, 212

(56) References Cited

U.S. PATENT DOCUMENTS

| | | |
|---|---|---|
| 5,752,072 A | 5/1998 | Agarwal ...................... 712/34 |
| 5,974,537 A * | 10/1999 | Mehra ........................ 712/215 |
| 6,076,154 A * | 6/2000 | Van Eijndhoven ........... 712/24 |
| 6,219,776 B1 | 4/2001 | Pechanek et al. ............. 712/20 |

* cited by examiner

Primary Examiner—John F. Niebling
Assistant Examiner—Stacy A Whitmore
(74) Attorney, Agent, or Firm—Price and Gess

(57) ABSTRACT

A processor that has a plurality of instruction slots each of which stores an instruction to be executed in parallel. One of the plurality of instruction slots is a first instruction slot and another a second instruction slot. A special instruction stored in the first instruction slot is executed by a first functional unit that executes instructions stored in the first instruction slot, and a second functional unit that executes instructions stored in the second instruction slot. An instruction stored in the second instruction slot is executed in parallel by a third functional unit that executes instructions stored in the second instruction slot.

17 Claims, 16 Drawing Sheets

FIG. 2 LONG-WORD INSTRUCTION (TWO INSTRUCTIONS)

FIG. 3

| INSTRUCTION | FIRST FIELD | SECOND FIELD | THIRD FIELD |
|---|---|---|---|
| | nop | 0 | 0 |
| | mov | Rn | Rm |
| | add | Rn | Rm |
| | sub | Rn | Rm |
| | adsb | Rn | Rm |
| | mul | Rn | Rm |

FIG. 4

INSTRUCTION SETS

| INSTRUCTION | MNEMONIC | PROCESSING CONTENT | ALLOCATED SLOT | |
|---|---|---|---|---|
| | | | FIRST? | SECOND? |
| DATA TRANSFER INSTRUCTION | mov Rn,Rm | TRANSFER DATA FROM Rn TO Rm | YES | NO |
| ADD INSTRUCTION | add Rn,Rm | STORE Rm+Rn IN Rm | YES | YES |
| SUBTRACT INSTRUCTION | sub Rn,Rm | STORE Rm−Rn IN Rm | YES | YES |
| ADD-SUBTRACT INSTRUCTION | adsb Rn,Rm | STORE Rm+Rn IN Rn AND Rm−Rn IN Rm | YES | YES |
| MULTIPLY INSTRUCTION | mul Rn,Rm | STORE Rm∗Rn IN Rm | NO | YES |
| NO-OPERATION INSTRUCTION | nop | NO OPERATION | YES | YES |

FIG. 7

OPERATION OF DECODER 104

| INPUT | OUTPUT x1 | | | OUTPUT y1 | | |
|---|---|---|---|---|---|---|
| | op | r1 | r2 | op | r1 | r2 |
| mov Rn1, Rm1 | TRANSFER | Rn1 | Rm1 | NO OPERATION | -- | -- |
| add Rn1, Rm1 | ADD | Rn1 | Rm1 | NO OPERATION | -- | -- |
| sub Rn1, Rm1 | SUBTRACT | Rn1 | Rm1 | NO OPERATION | -- | -- |
| adsb Rn1, Rm1 | ADD | Rn1 | Rn1 | SUBTRACT | Rn1 | Rm1 |
| nop | NO OPERATION | -- | -- | NO OPERATION | -- | -- |

FIG. 8

OPERATION OF DECODER 105

| INPUT | OUTPUT x2 | | | OUTPUT y2 | | |
|---|---|---|---|---|---|---|
| | op | r1 | r2 | op | r1 | r2 |
| add Rn2, Rm2 | NO OPERATION | -- | -- | ADD | Rn2 | Rm2 |
| sub Rn2, Rm2 | NO OPERATION | -- | -- | SUBTRACT | Rn2 | Rm2 |
| adsb Rn2, Rm2 | SUBTRACT | Rn2 | Rm2 | ADD | Rn2 | Rm2 |
| mul Rn2, Rm2 | NO OPERATION | -- | -- | MULTIPLY | Rn2 | Rm2 |
| nop | NO OPERATION | -- | -- | NO OPERATION | -- | -- |

FIG. 9

OPERATION OF SELECTOR 106

| INPUT a1 | | | INPUT b1 | | | OUTPUT | | |
|---|---|---|---|---|---|---|---|---|
| x1_op | x1_r1 | x1_r2 | x2_op | x2_r1 | x2_r2 | s1_op | s1_r1 | s1_r2 |
| (1) ADD | Rn1 | Rm1 | NO OPERATION | -- | -- | ADD | Rn1 | Rm1 |
| (2) SUBTRACT | Rn1 | Rm1 | NO OPERATION | -- | -- | SUBTRACT | Rn1 | Rm1 |
| (3) ADD | Rn1 | Rm1 | NO OPERATION | -- | -- | ADD | Rm1 | Rn1 |
| (4) TRANSFER | Rn1 | Rm1 | NO OPERATION | -- | -- | TRANSFER | Rn1 | Rm1 |
| (5) TRANSFER | Rn1 | -- | SUBTRACT | Rn2 | Rm2 | SUBTRACT | Rn2 | Rm2 |
| (6) NO OPERATION | -- | -- | SUBTRACT | Rn2 | Rm2 | SUBTRACT | Rn2 | Rm2 |
| (7) NO OPERATION | -- | -- | NO OPERATION | -- | -- | NO OPERATION | -- | -- |

FIG. 10

OPERATION OF SELECTOR 107

| | INPUT a2 | | | INPUT b2 | | | OUTPUT | | |
|---|---|---|---|---|---|---|---|---|---|
| | y1_op | y1_r1 | y1_r2 | y2_op | x2_r1 | x2_r2 | s2_op | s2_r1 | s2_r2 |
| (1) | NO OPERATION | -- | -- | ADD | Rn2 | Rm2 | ADD | Rn2 | Rm2 |
| (2) | NO OPERATION | -- | -- | SUBTRACT | Rn2 | Rm2 | SUBTRACT | Rn2 | Rm2 |
| (3) | NO OPERATION | -- | -- | ADD | Rm2 | Rn2 | ADD | Rm2 | Rn2 |
| (4) | SUBTRACT | Rn1 | Rm1 | MULTIPLY | Rn2 | Rm2 | SUBTRACT | Rn1 | Rm1 |
| (5) | SUBTRACT | Rn1 | Rm1 | NO OPERATION | -- | -- | SUBTRACT | Rn1 | Rm1 |
| (6) | NO OPERATION | -- | -- | MULTIPLY | Rn2 | Rm2 | MULTIPLY | Rn2 | Rm2 |
| (7) | NO OPERATION | -- | -- | NO OPERATION | -- | -- | NO OPERATION | -- | -- |

FIG. 11

OPERATION OF DATA TRANSFER UNIT 108

| INPUT | | | OPERATION CONTENT |
|---|---|---|---|
| X1_op | x1_r1 | x1_r2 | |
| TRANSFER | Rn1 | Rm1 | TRANSFER DATA FROM Rn1 TO Rm1 |

FIG. 12

OPERATION OF CALCULATION UNIT 109

| INPUT | | | OPERATION CONTENT |
|---|---|---|---|
| s1_op | s1_r1 | s1_r2 | |
| (1) ADD | Rn1 | Rm1 | STORE Rm1+Rn1 IN Rm1 |
| (2) SUBTRACT | Rn1 | Rm1 | STORE Rm1−Rn1 IN Rm1 |
| (3) ADD | Rm1 | Rn1 | STORE Rn1+Rm1 IN Rn1 |
| (4) SUBTRACT | Rn2 | Rm2 | STORE Rm2−Rn2 IN Rm2 |

FIG. 13

OPERATION OF CALCULATION UNIT 110

| INPUT | | | OPERATION CONTENT |
|---|---|---|---|
| s2_op | s2_r1 | s2_r2 | |
| (1) ADD | Rn2 | Rm2 | STORE Rm2+Rn2 IN Rm2 |
| (2) SUBTRACT | Rn2 | Rm2 | STORE Rm2−Rn2 IN Rm2 |
| (3) ADD | Rm2 | Rn2 | STORE Rn2+Rm2 IN Rn2 |
| (4) SUBTRACT | Rn1 | Rm1 | STORE Rm1−Rn1 IN Rm1 |

FIG. 14

OPERATION OF MULTIPLICATION UNIT 111

| INPUT | | | OPERATION CONTENT |
|---|---|---|---|
| y2_op | y2_r1 | y2_r2 | |
| MULTIPLY | Rn2 | Rm2 | STORE Rm2 ∗ Rn2 IN Rm2 |

VALUES OF PROGRAM VARIABLES STORED IN REGISTERS

| REGISTER | VARIABLE |
| --- | --- |
| R0 | a [0] |
| R1 | a [1] |
| R2 | a [2] |
| R3 | a [3] |
| R4 | f0 |
| R5 | f1 − f2 |
| R6 | f1 + f2 |
| R7 | f2 |

FIG. 17

| LONG-WORD INSTRUCTION | FIRST INSTRUCTION SLOT | | SECOND INSTRUCTION SLOT | |
|---|---|---|---|---|
| 1. | adsb | R2, R1 | nop | |
| 2. | mov | R1, R8 | adsb | R3, R0 |
| 3. | mov | R0, R9 | mul | R5, R1 |
| 4. | add | R9, R8 | mul | R6, R0 |
| 5. | adsb | R2, R3 | mul | R7, R8 |
| 6. | add | R8, R1 | mul | R4, R2 |
| 7. | sub | R8, R0 | mul | R4, R3 |

FIG. 18

| LONG-WORD INSTRUCTION | FIRST INSTRUCTION SLOT | SECOND INSTRUCTION SLOT |
|---|---|---|
| 1. | mov R1, R8 | sub R2, R1 |
| 2. | mov R0, R9 | sub R3, R0 |
| 3. | mov R1, R10 | mul R5, R1 |
| 4. | mov R0, R11 | mul R6, R0 |
| 5. | add R11, R10 | add R2, R8 |
| 6. | add R3, R9 | mul R7, R10 |
| 7. | add R10, R1 | sub R10, R0 |
| 8. | mov R9, R12 | add R8, R9 |
| 9. | sub R8, R12 | mul R4, R9 |
| 10. | nop | mul R4, R12 |

PROCESSOR FOR MAKING MORE EFFICIENT USE OF IDLING COMPONENTS AND PROGRAM CONVERSION APPARATUS FOR THE SAME

This application is based on an application No. 10-083369 filed in Japan, the content of which is hereby incorporated by reference.

BACKGROUND OF THE INVENTION

1. Field of the Invention

The present invention relates to a processor that executes a plurality of instructions in parallel and to a program conversion apparatus for the same.

2. Description of the Related Art

In recent years, VLIW (Very Long Instruction Word) processors have been developed with the aim of achieving high-speed processing. These processors use long-word instructions composed of a plurality of instructions to execute a number of instructions in parallel.

Japanese Laid-Open Patent No. 5-11979 discloses an example of this kind of technique. FIG. 1 is a block diagram of a processor disclosed in this document.

The processor of FIG. 1 includes a register file 1, an external memory 2, an instruction register 3 having four instruction slots, an input switching circuit 4, a transfer unit 5, a integer calculation unit 6, a transfer unit 7, an integer calculation unit 8, an integer calculation unit 9, a floating-point unit 10, a branch unit 11, an output switching circuit 12 and a register file or external memory 13.

The instruction register 3 stores four instructions, which make up one long-word instruction, in its four internal instruction slots (hereafter referred to as 'slots'). Here, the instruction in each of the first and second slots is either an integer calculating instruction or a data transfer instruction (also referred to as a load/store instruction). The instruction in the third slot is a floating-point calculating instruction or an integer calculating instruction and that in the fourth slot is a branch instruction. The arrangement of instructions in one long-word instruction is performed in advance by a compiler.

The transfer unit 5 and the integer calculation unit 6 are aligned with the first slot, and execute the data transfer and integer calculating instructions respectively.

The transfer unit 7 and the integer calculation unit S are aligned with the second slot, and execute the data transfer and integer calculating instructions respectively.

The integer calculation unit 9 and the floating-point unit 10 are aligned with the third slot, and execute the integer calculation and floating-point instructions respectively.

The branch unit 11 is aligned with the fourth slot and executes branch instructions.

Here, the transfer units 5 and 7, the integer calculation units 6, 8 and 9, the floating-point unit 10 and the branch unit 11 are generally referred to as functional units.

The input switching circuit 4 inputs source data read from the register file 1 or the external memory 2 into the required functional units.

The output switching circuit 12 outputs the results of calculations by the utilized functional units to the register file or external memory 13.

A processor constructed as above decodes and executes instructions stored in the four slots in parallel. Assume, for example, that an 'add' instruction for adding register data is stored in the first slot. The processor inputs two pieces of register data from the register file 1 into the integer calculation unit 6 via the input switching circuit 4. The two pieces of register data are then added by the integer calculation unit 6 and the result stored in the register file 13 via the output switching circuit 12. Instructions in the second, third and fourth slots are also decoded and executed in parallel with this instruction.

However, in this kind of conventional processor certain functional units are left idling when instructions are executed. When an integer calculating instruction is executed by the third slot, for example, the floating-point unit is left idling.

SUMMARY OF THE INVENTION

An object of the present invention is to provide a processor that utilizes idling functional units, thus improving processing performance.

A second object is to provide a processor that executes at a high speed the product-sum operations frequently used in current multimedia processing.

A processor that achieves the above objects includes first and second decoding units, first and second executing units corresponding to the first and second decoding units, and a selecting unit. The first and second executing units decode instructions and generate results denoting their content. It the first decoding unit decodes a special instruction, it generates first-part and second-part decode results denoting a first-type calculation and a second-type calculation. The executing units execute instructions in parallel according to a decode result from the corresponding decoding unit. If the first decoding unit decodes the special instruction, the selecting unit selects the second-part decode result, and if the first decoding unit decodes an instruction other than the special instruction, the selecting unit selects the decode result from the second decoding unit.

The second executing unit includes a first functional unit, which executes instructions according to the decode result selected by the selecting unit, and a second functional unit, which executes instructions according to the decode result of the second decoding unit. If the special instruction is decoded, the first executing unit performs a first-type calculation, the first functional unit performs a second-type calculation and the second functional unit executes an instruction decoded by the second decoding unit.

Here, the special instruction may include an operation code denoting the first-type calculation and the second-type calculation, and first and second operands. The first executing unit performs the first-type calculation on the first and second operands, and stores a calculation result in the first operand. Meanwhile, the second executing unit performs the second-type calculation on the first and second operands, and stores a calculation result in the second operand.

This structure enables a first-type calculation and a second-type calculation to be executed by the first and second executing units according to a special instruction in one instruction slot. This allows idling functional units to be used, thus increasing processing performance.

Here, the first executing unit may include an adder/subtracter, the first functional unit be an adder/subtracter and the special instruction denote addition as the first-type calculation and subtraction as the second-type calculation.

This structure enables an instruction other than the special instruction to be executed in parallel with the addition and subtraction denoted by the special instruction, so that the processing performance of the processor can be further increased.

Here, the second functional unit is a multiplier and the instruction is a multiply instruction This structure enables addition, subtraction and multiplication to be executed in parallel, so that product-sum calculations extensively used in modern multimedia processing can be executed efficiently.

Furthermore, a program conversion apparatus that achieves the above objects is one that changes a source program to an object program for a target processor executing long-word instructions. This program conversion apparatus includes a retrieving unit, a generating unit and an arranging unit. The retrieving unit retrieves a pair of instructions denoting a first-type calculation of two variables and a second-type calculation of the same two variables from a source program. The generating unit generates a special instruction corresponding to the retrieved pair. This special instruction includes an operation code denoting the first-type calculation and the second-type calculation, and two operands representing the two variables. The arranging unit arranges the generated special instruction into a long-word instruction.

This structure generates an object program, composed of a plurality of long-word instructions. Special instructions supported by the target processor are embedded in certain of the plurality of long-word instructions.

Here, the first instruction denotes addition, and the second instruction denotes subtraction. The target processor includes a first instruction execution unit having a first calculation unit, and a second instruction execution unit having a second calculation unit and a multiplication unit. The arranging unit retrieves a multiply instruction that does not share dependency with the special instruction generated by the generating unit, and arranges the special instruction and the multiply instruction in one long-word instruction.

This structure enables addition, subtraction and multiplication to be performed in parallel by aligning two instructions (a special instruction and a multiplication instruction) found in one long-word instruction in parallel. This makes the operation suitable for a program compiler performing product-sum calculations.

BRIEF DESCRIPTION OF THE DRAWINGS

These and other objects, advantages and features of the invention will become apparent from the following description thereof taken in conjunction with the accompanying. drawings which illustrate a specific embodiment of the invention. In the drawings:

FIG. 3 shows the format of instructions;

FIG. 4 shows the instruction set of the processor;

FIG. 7 shows the content of control signals output from the decoder aligned to the first slot;

FIG. 8 shows the content of control signals output from the decoder aligned to the second slot;

FIG. 9 shows the relationship between two inputs to a selector on the first slot side and an output from the same selector;

FIG. 10 shows the relationship between two inputs to a selector on the second slot side and an output from the same selector;

FIG. 11 shows the operation content of a data transfer unit aligned with the first slot;

FIG. 12 shows the operation content of a calculation unit aligned with the first slot;

FIG. 13 shows the operation content of a calculation unit aligned with the second slot;

FIG. 14 shows the operation content of a multiplication unit aligned with the second slot;

FIG. 15 shows an example source program describing a discrete cosine transform;

FIG. 16 is a table showing the correspondence between registers and variables in an example program;

FIG. 17 shows an example program composed of long-word instructions for use by the processor in the present embodiment;

FIG. 18 shows an example of a program composed of long-word instructions for use by a conventional processor.

DESCRIPTION OF THE PREFERRED EMBODIMENT

Structure of the Processor

Figure 1:
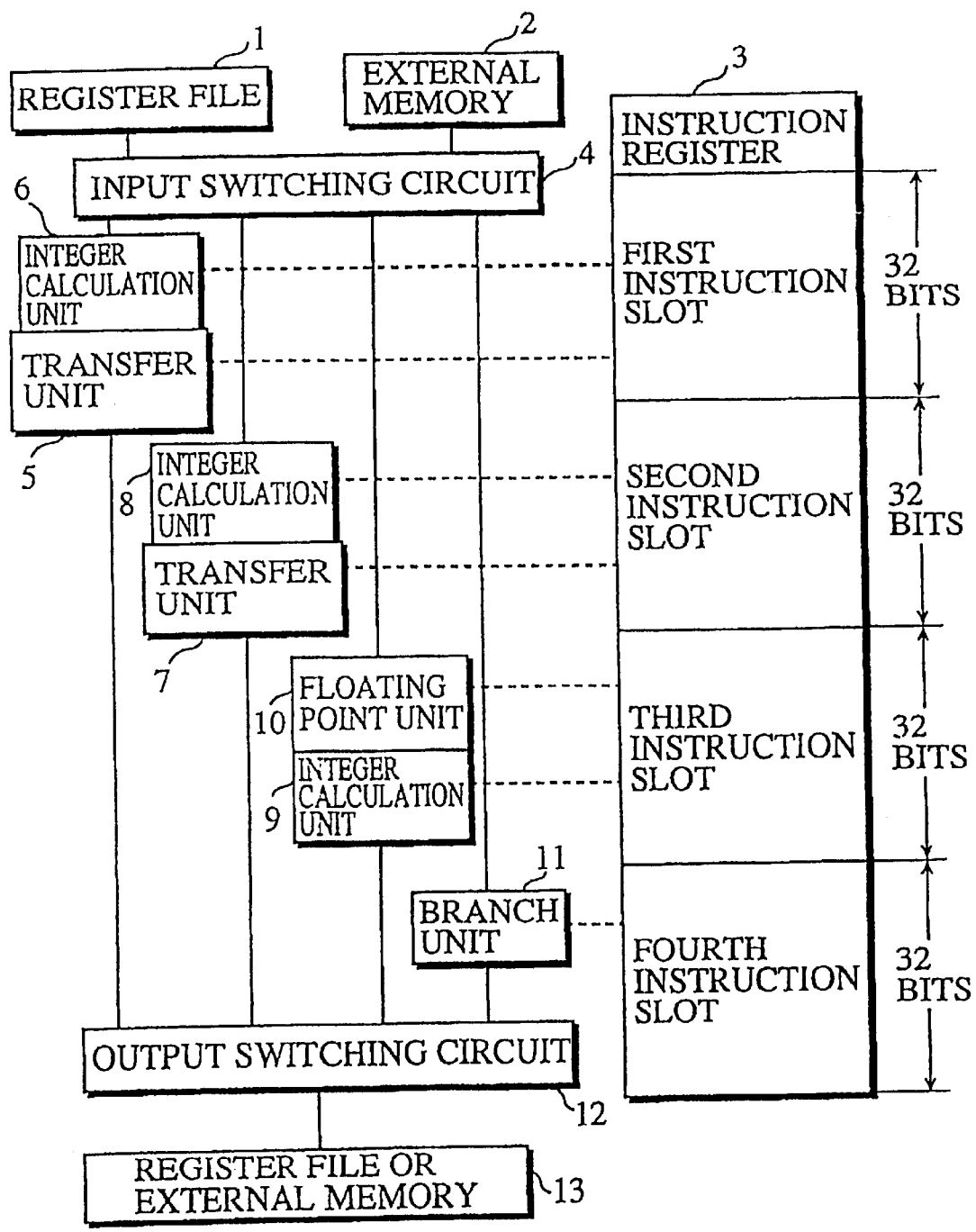
FIG. 1 is a block diagram showing a conventional processor.
Figure 2:
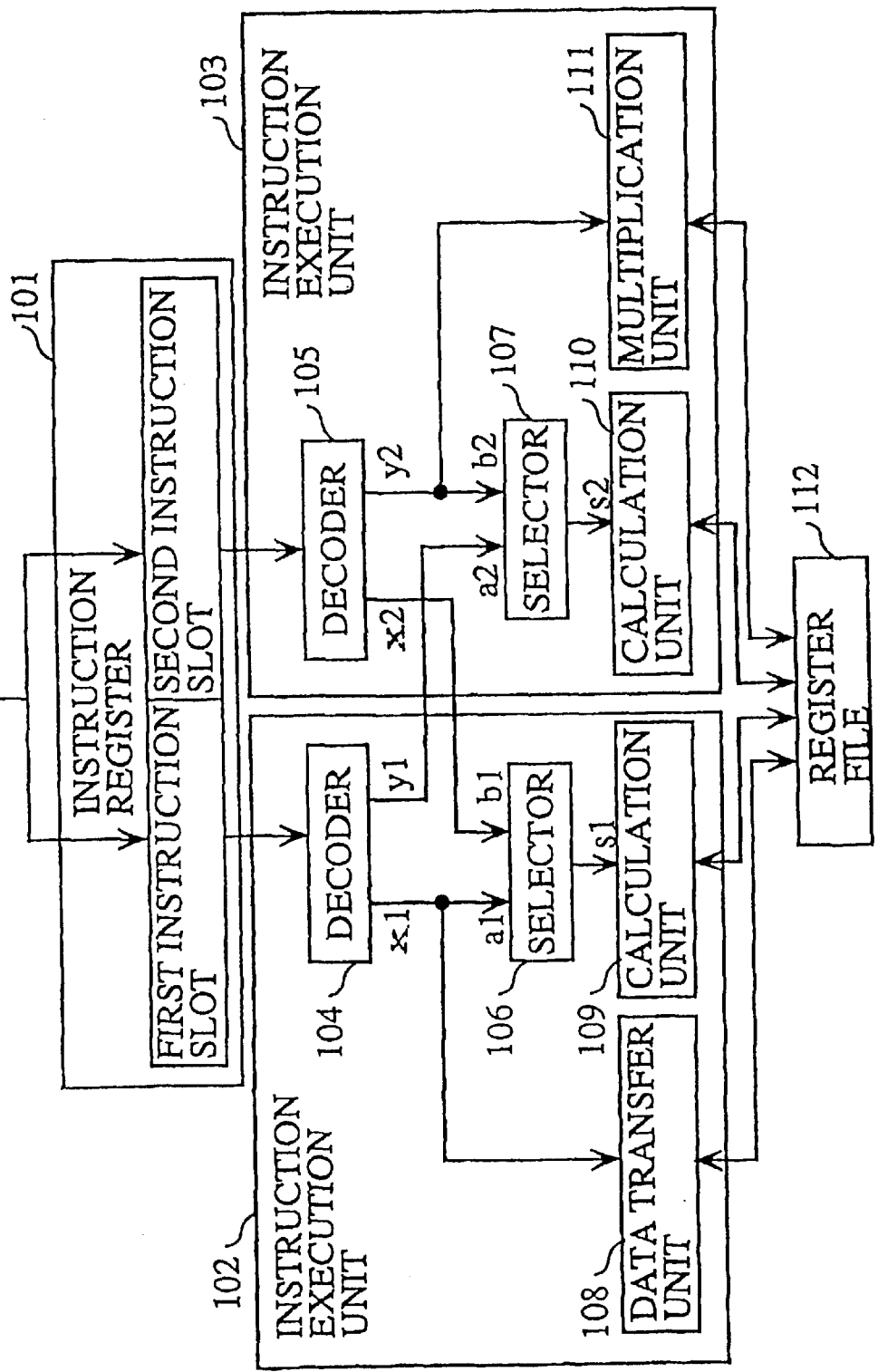
FIG. 2 is a block diagram showing a structure for a processor in the present embodiment.

FIG. 2 is a block diagram showing the structure of a processor in the present embodiment. This processor includes an instruction register 101, instruction execution units 102 and 103 (hereafter referred to as 'execution units') and register file 112. The execution unit 102 includes a decoder 104, a selector 106, a data transfer unit 108 and a calculation unit 109. Furthermore, the execution unit 103 similarly includes a decoder 105, a selector 107, a calculation unit 110 and a multiplication unit 111.

For ease of explanation, it is assumed that one long-word instruction in the present embodiment is composed of two parallel instructions. The information register 101 fetches these instructions from a memory (not shown here) and stores them in first and second instruction slots (hereafter referred to as the 'first and second slots'). Each slot stores one instruction. The format of these instructions is shown in FIG. 3. Each of the instructions shown in this drawing is composed of a first field representing an operation code, and second and third fields showing register numbers as operands. The long-word instruction has a fixed length. FIG. 3 shows six instructions as representative examples. Of these, an 'adsb' instruction is of particular importance to the present invention. The 'adsb' instruction instructs one of the execution units 102 and 103 to perform addition and the other subtraction. These executions take place simultaneously. Hereafter, the 'adsb' instruction is also referred to as the 'special instruction' and other instructions as 'standard instructions'.

The execution unit 102 decodes and executes an instruction stored in the first slot. On decoding a special instruction, the execution unit 102 performs addition, while instructing execution unit 103 to perform simultaneous subtraction.

Similarly, the execution unit 103 decodes and executes an instruction stored in the second slot. On decoding a special instruction, the instruction unit 103 performs addition, while instructing execution unit 102 to perform simultaneous subtraction.

The register file 112 has a plurality of registers.

Instruction Set

FIG. 4 shows the instruction set of the processor. This diagram indicates whether the processing content for each of the representative six instructions can be allocated to the first and second slots.

In FIG. 4, an 'instruction' column shows the standard names of instructions.

A 'mnemonic' column shows mnemonic notations used in assembly language. These mnemonics are composed of an 'op' part, which represents the first field (operation code) and two operand parts, which represent the second and third fields. The operand parts Rn and Rm each represent one register in the register file 112.

A 'processing content' column shows the content of an operation represented by the 'op' part.

An 'allocated slot' column shows whether an instruction can be placed in each of the first and second slots (represented by the columns 'first' and 'second' in the diagram). For example, a 'mov' data transfer instruction can be placed in the first slot, but not in the second slot.

As shown in FIG. 4, a 'mov Rn, Rm' instruction is a data transfer instruction for reading data from a register Rn and storing it in a register Rm. This instruction is executed by the data transfer unit 108. An 'add Rn, Rm' instruction is an 'add' instruction for reading data from registers Rn and Rm, adding the read data and storing the result in register Rm. This instruction is executed by the calculation unit 109 or 110. A 'sub Rn, Rm' instruction is a subtract instruction for reading data from registers Rn and Rm subtracting the data of register Rn from the data of register Rm and storing the result in register Rm. This instruction is executed by the calculation units 109 or 110.

Here, an 'adsb Rn, Rm' instruction is an add-subtract instruction for reading the data from registers Rn and Rm, performing parallel addition and subtraction on the data, and storing the result of the addition in register Rn and that of the subtraction in register Rm This instruction is executed by the calculation units 109 or 110, Execution Units The execution units 102 and 103 execute the special instruction as well as various standard instructions.

In the execution unit 102, the decoder 104 decodes an instruction stored in the first slot and outputs a decode result, composed of control signals x1 and y1, for executing the instruction.

Here, if a special instruction is decoded by the decoder 104, the control signals x1 instruct the calculation unit 109 to perform addition. If a standard instruction is decoded, the control signals x1 instruct the data transfer unit 108 to transfer data, or the calculation unit 109 to perform a calculation. Meanwhile, if a special instruction is decoded, the control signals y1 instruct the selector 107 inside the execution unit 103 to select input a2 (control signals y1) and the calculation unit 110 to execute subtraction.

The selector 106 receives the control signals x1 output from the decoder 104 (input al in FIG. 2) and the control signals x2 output from the decoder 105 (input b1), and one of the two inputs is selected according to control by the decoder 105, not the decoder 104. Specifically, when the decoder 105 decodes a special instruction, the selector 106 selects input control signals x2) and when the decoder 105 decodes a standard instruction, the selector 106 selects input a1 (control signals x1).

The data transfer unit 108 transfers data according to the control signals x1 when a data transfer instruction is decoded by the decoder 104.

The calculation unit 109 performs calculation according to the control signals selected by selector 106. That is, if the decoder 105 decodes a special instruction, the calculation unit 109 executes subtraction in accordance with the control signals x2 selected by the selector 106. Meanwhile, if the decoder 105 decodes a standard instruction, the calculation unit 109 performs a calculation in accordance with the control signals x1 selected by the selector 106 Here, if a standard instruction is decoded by the decoder 105 and a special instruction by the decoder 104, addition is executed in accordance with control signals x1.

On the other hand, in execution unit 103, the decoder 105 decodes an instruction stored in the second slot and outputs a decode result, composed of control signals x2 and y2, for executing the instruction.

Here, if the decoder 105 decodes a special instruction, the control signals x2 instructs the selector 106 inside the execution unit 102 to select input bL (control signals x2) and the calculation unit 109 is instructed to execute subtraction. If the decoder 105 decodes a special instruction, the control signals y2 instruct the calculation unit 110 to execute addition. If the decoder 105 decodes a standard instruction, the control signals y2 instruct the multiplication unit 111 to execute multiplication or the calculation unit 110 to perform calculation.

The selector 107 receives control signals y1 (input a2) output from the decoder 104, and control signals y2 (input b2) output from the decoder 105, and selects one of the two inputs according to a control by the decoder 104, not the decoder 105. That is, when a special instruction is decoded by decoder 104, the selector 107 chooses input a2 (control signals yl) and when a standard instruction is decoded, the selector 107 selects input b2 (control signals y2).

The calculation unit 110 performs calculation according to the control signals selected by selector 107. That is, if a special instruction is decoded by the decoder 104, the calculation unit 110 executes subtraction in accordance with the control signals y1 selected by the selector 107. Meanwhile, if a calculation instruction is decoded as a standard instruction, the calculation unit 110 performs calculation in accordance with the control signals y2 selected by the selector 107. Here, if a standard instruction is decoded by decoder 104 and a special instruction by the decoder 105, addition is executed in accordance with control signals y2.

If a multiply instruction is decoded by the decoder 105, multiplication unit 111 executes multiplication in accordance with the control signals y2.

Decoder 104

Figure 5:
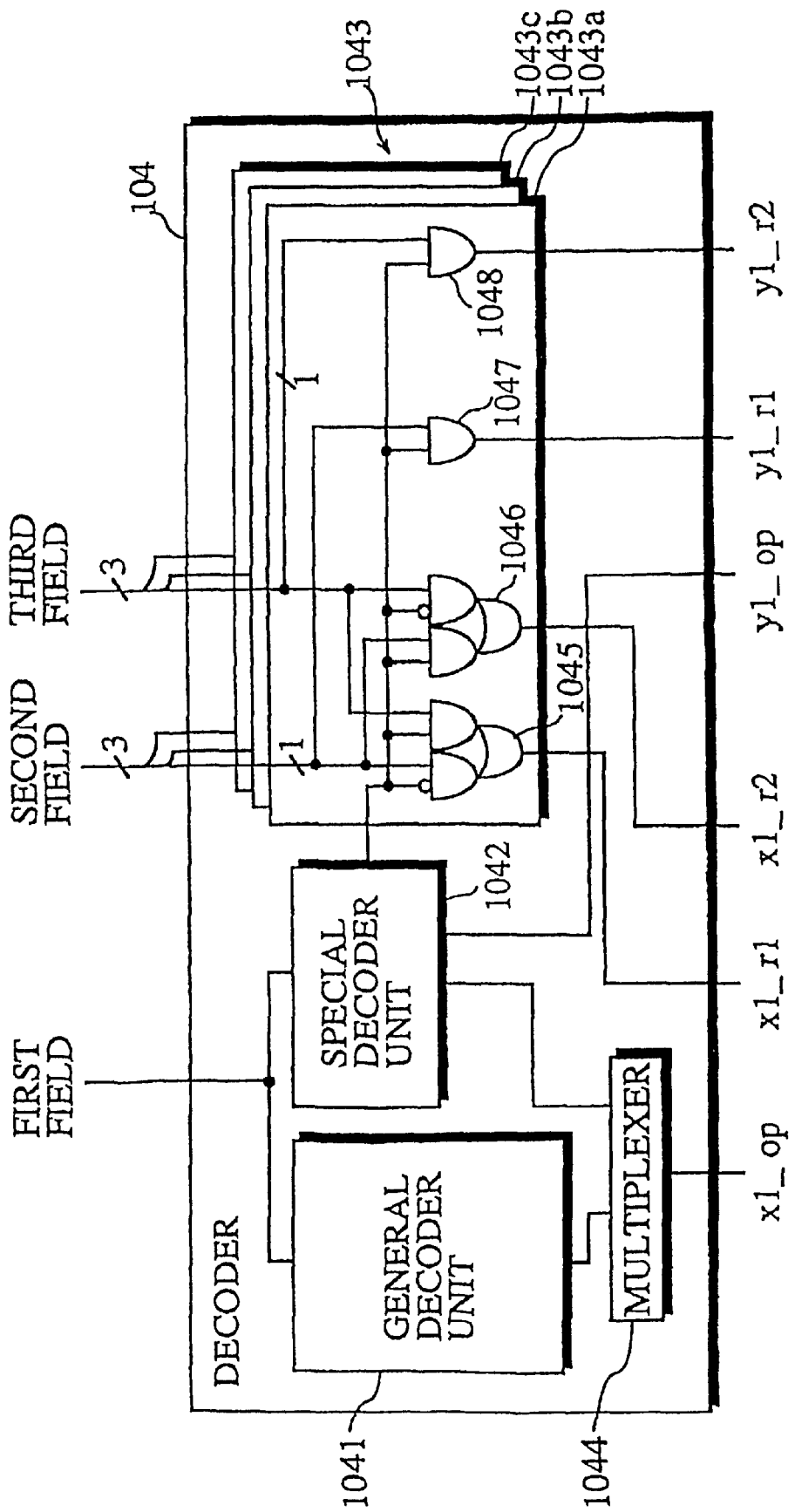
FIG. 5 is a block diagram showing a structure for a decoder aligned to a first slot.

FIG. 5 is a block diagram showing the structure of the decoder 104 in FIG. 2. The decoder 104 includes a general decoder unit 104, a special decoder unit 1042, an operand control unit 1043 and a multiplexer 1044. The control signals x1 described above are composed of the output signals $x1_{13}$ op (control signals corresponding to an op code), $x1_{13}$ r1 (register number) and $x1_{13}$ r2 (register number) shown in the diagram. Similarly, the control signals y1 described above are composed of the output signals $y1_{13}$ op, $y1\_r1$ and $y1\_r2$. The content of each of these signals is shown in FIG. 7.

In FIG. 5, the general decoder unit 1041 receives and decodes the first field of an instruction. If the result is a standard instruction, the general decoder unit 1041 outputs a control signals $x1_{13}$ $op_{13}$ 1 indicating the operation content of the instruction.

The special decoder unit 1042 receives and decodes the first field of an instruction. If the result is an 'adsb' instruction, the special decoder unit 1042 outputs control signals indicating the operation content of the 'adsb' instruction and instructs the operand control unit 1043 to supply operands. Here, the control signals indicating the operation content of the 'adsb' instruction include 'add' control signals $x1\_op_{13}$ 2 and subtract control signals $y1_{13}$ op.

The multiplexer 1044 receives the control signals $x1_{13}$ $op_{13}$ 1 and the control signals $x1_{13}$ $op_{13}$ 2. If the special decoder unit 1042 has not decoded an 'adsb' instruction, the multiplexer 1044 selects the control signals $x1_{13}$ $op_{13}$ 1, but if an 'adsb' instruction has been decoded the multiplexer 1044 selects the control signals $x1_{13}$ $op_{13}$ 2.

The operand control unit 1043 is composed of control sections 1043a to c, each of which corresponds to one bit in each of the second and third fields. In the present embodiment, the second and third fields are each composed of three bits. If an 'adsb' instruction is not decoded by the special decoder unit 1042, the operand control unit 1043 supplies register numbers ($x1_{13}$ r1, $x1_{13}$ r2) specified by the operands to the inside of execution unit 102 only. If an 'adsb' instruction is decoded, the operand control unit 1043 supplies register numbers ($y1_{13}$ r1, $y1_{13}$ 2) specified by the operands to the execution unit 103 as well as the execution unit 102.

The operand control unit 1043a is composed of gate sets 1045 and 1046 and AND gates 1047 and 1048. Here, a register number Rn, control signals $x1_{13}$ r1, control signals $x1_{13}$ r2 and the like are each three bits. The operand control units 1043a to c each correspond in order to one bit of the three bits.

If an 'adsb' instruction is not decoded by the special decoder unit 1042, the gate sets 1045 and 1046 output a register number Rn indicated by the second field of the instruction as $x1_{13}$ r1, and a register number Rm indicated by the third field of the instruction as $x1_{13}$ r2. If a special instruction is decoded, the gate sets 1045 and 1046 output the register number Rn indicated by the second field of the instruction as $x1_{13}$ r2, and the register number Rm indicated by the third field of the instruction as $x1_{13}$ r1 That is, when a standard instruction is decoded, the gate sets 1045 and 1046 output the second and third fields of the instruction in the usual order (Rn, Rm) as ($x1_{13}$ r1 and $x1_{13}$ r2), and when a special instruction is decoded, output the first and second fields of the instruction in the reverse order (Rm, Rn) as ($x1_{13}$ r1, $x1_{13}$ r2). The reason for reversing the order is to make the operand of the second field the destination register for an 'adsb' instruction.

If a special instruction is decoded, the AND gates 1047 and 1048 output a register Rn indicated by the second field as $y1_{13}$ r1, and a register Rm indicated by the third field as $y1_{13}$ r2. These signals y1_r1 and y1_r2, combined with y1_op, cause the execution unit 103 to perform subtraction just as if the subtract instruction 'sub, Rn, Rm' had been decoded from the second slot and executed.

The operand control unit 1043b and c only differ from the operand control unit 1043a in corresponding to different bit positions in the second and third fields, but apart from that have the same structure. These operand control units 1043a to c generate signals x1_r1, $x1_{13}$ r2, $y1_{13}$ r1 and $y1_{13}$ r2, which are each three bits.

Decoder 105

Figure 6:
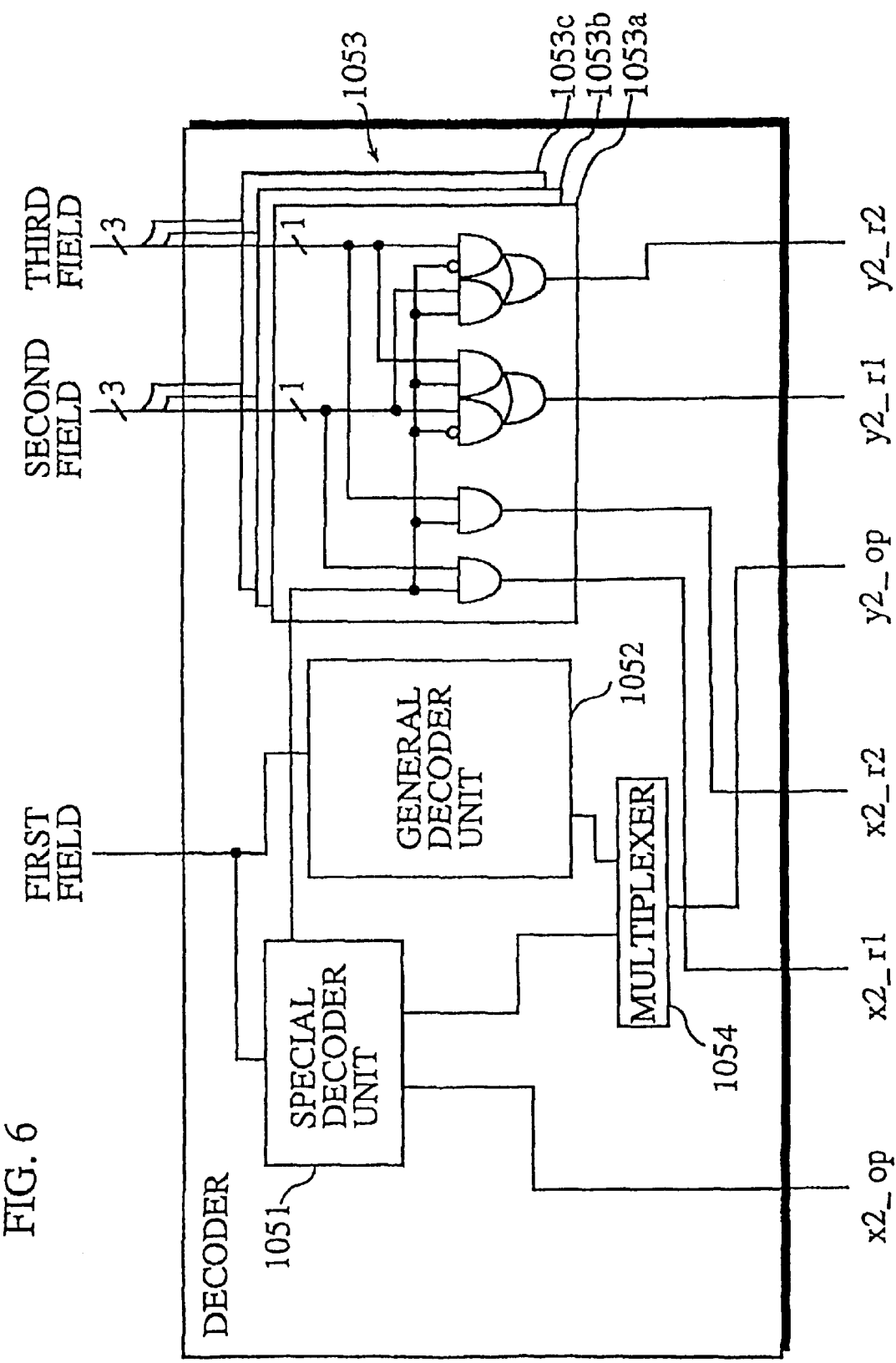
FIG. 6 is a block diagram showing a structure for a decoder aligned to a second slot.

FIG. 6 is a block diagram showing a structure of the decoder 105 in FIG. 2. The content of the output signals $x2_{13}$ op, $x2_{13}$ r1 and x2_r2 is shown in FIG. 8.

The structure of the decoder 105 shown in FIG. 6 is a mirror image of that of the decoder 104 shown in FIG. 5.

Both decoders are formed from the same components, and so a description of the decoder 105 is omitted.

Selectors 106 and 107

FIG. 9 shows the relationship between inputs a1 and b1 and output for the selector 106 of FIG. 2. This diagram shows the details of what happens when the decoder 104 decodes each of (1) an 'add' instruction, (2) a 'sub' instruction, (3) an 'adsb' instruction, (4) and (5) 'mov' instructions, and (7) and (7) 'nop' instructions.

In the case of instructions (1) to (4) the selector 106 selects input al. If (1) the 'add' instruction and (3) the 'adsb' instruction are compared, it can be seen that the control signal content x1_op of both is addition, but that the control signal contents $x1_{13}$ r1, and x1_r2 are reversed in the case of the 'adsb' instruction. This is because the result of the subtraction from the execution unit 103 is stored in register Rm, causing the result of the addition from the execution unit 102 to be stored in register Rn.

In the case of instructions (5) the selector 106 selects the input b1. Here the decoder 104 decodes a 'mov' instruction, while the decoder 105 decodes an 'adsb' instruction in parallel. The 'mov' instruction and the 'adsb' instruction are executed in parallel.

In the case of instruction (7), the selector 106 selects the input b1. Here the decoder 104 decodes a 'nop' instruction, while the decoder 105 decodes an 'ads' instruction in parallel.

In the case of (7), the selector 107 selects the input a1, but the content of control signals $x1_{13}$ op is no operation.

FIG. 10 shows the relationship between the inputs a2 and b2 and output for the selector 107 in FIG. 2. Here, the details of what happens when the decoder 105 decodes each of (1) an 'add' instruction, (2) a 'sub' instruction, (3) an 'adsb' instruction, (4) a 'Mul' instruction, (5) a 'nop' instruction, (7) a 'mul' instruction and (7) a 'nop' instruction are shown. In the case of instructions (1) to (3), (6) and (7), the selector 107 selects the input b2. If (1) the 'add' instruction and (3) the 'adsb' instruction are compared, it can be seen that the $y2_{13}$ op control signal content of both is addition, but that the control signal contents $y1_{13}$ r1, and $y1_{13}$ r2 are reversed in the case of the 'adsb' instruction, This is because the result of the subtraction from the execution unit 102 is stored in register Rm, causing the result of the addition from the execution unit 103 to be stored in register Rn.

In the case of instruction (4), the selector 107 selects the input a2. Here the decoder 105 decodes a 'mul' instruction, while the decoder 104 decodes an 'adsb' instruction in parallel. The 'adsb' instruction and the 'mul' instruction are executed in parallel, In the case of instruction (5), the selector 107 selects input a2. Here, the decoder 105 decodes a 'nop' instruction, while the decoder 104 decodes an 'adsb' instruction in parallel.

Functional Units

FIG. 11 shows the content of operations performed by the data transfer unit 108. If a 'mov Rn1, Rm1' instruction stored in the first slot is decoded, the data transfer unit 108 transfers the data in register Rn1 to register Rm1. FIG. 12 shows the content of operations performed by the calculation unit 109. The diagram shows the operations for (1) a first slot 'add Rn1, Rm1' instruction, (2) a first slot 'sub Rn1, Rm1' instruction, (3) a first slot 'adsb Rn1, Rm1' instruction and (4) a second slot 'adsb Rn2, Rm2' instruction.

The content of the control signals $s1_{13}$ op for addition performed by (1) the 'add' instruction and (3) the 'adsb' instruction is the same. However, the destination register differs according to the instruction. The destination register for (1) the 'add' instruction is the third field Rm1 and for (3) the 'adsb' instruction the second field Rn1. This is because the control signals s1_r1 and the control signals s1_r2 are switched by the operand control unit 1043 in the case of (3) the 'adsb' instruction.

Here, the content of control signals s1_op for subtraction performed by (2) the first slot 'sub Rn1, Rm1' instruction and (4) the second slot 'adsb Rn2, Rm2' instruction is the same. The destination register for both these instructions is the second field Rn1 or Rm2.

FIG. 13 shows the content of operations performed by the calculation unit 110. The calculation unit shown in this diagram is the same as calculation unit 109 of FIG. 12 and so an explanation is not given here FIG. 14 shows the content of operations performed by the multiplication unit 111. If a 'mul Rn2, Rm2' instruction stored in the second slot is decoded, the multiplication unit 111 calculates the product of Rm2*Rn2 and stores the result in register Rm2.

Program

The following is an explanation of the operation of an example program using an 'adsb' instruction, which is operated by a processor constructed as described above. It should be noted that in the following explanation the second and third fields of an instruction are each four bits, and the processor has sixteen registers R0 to R15.

Figures 15, 16:
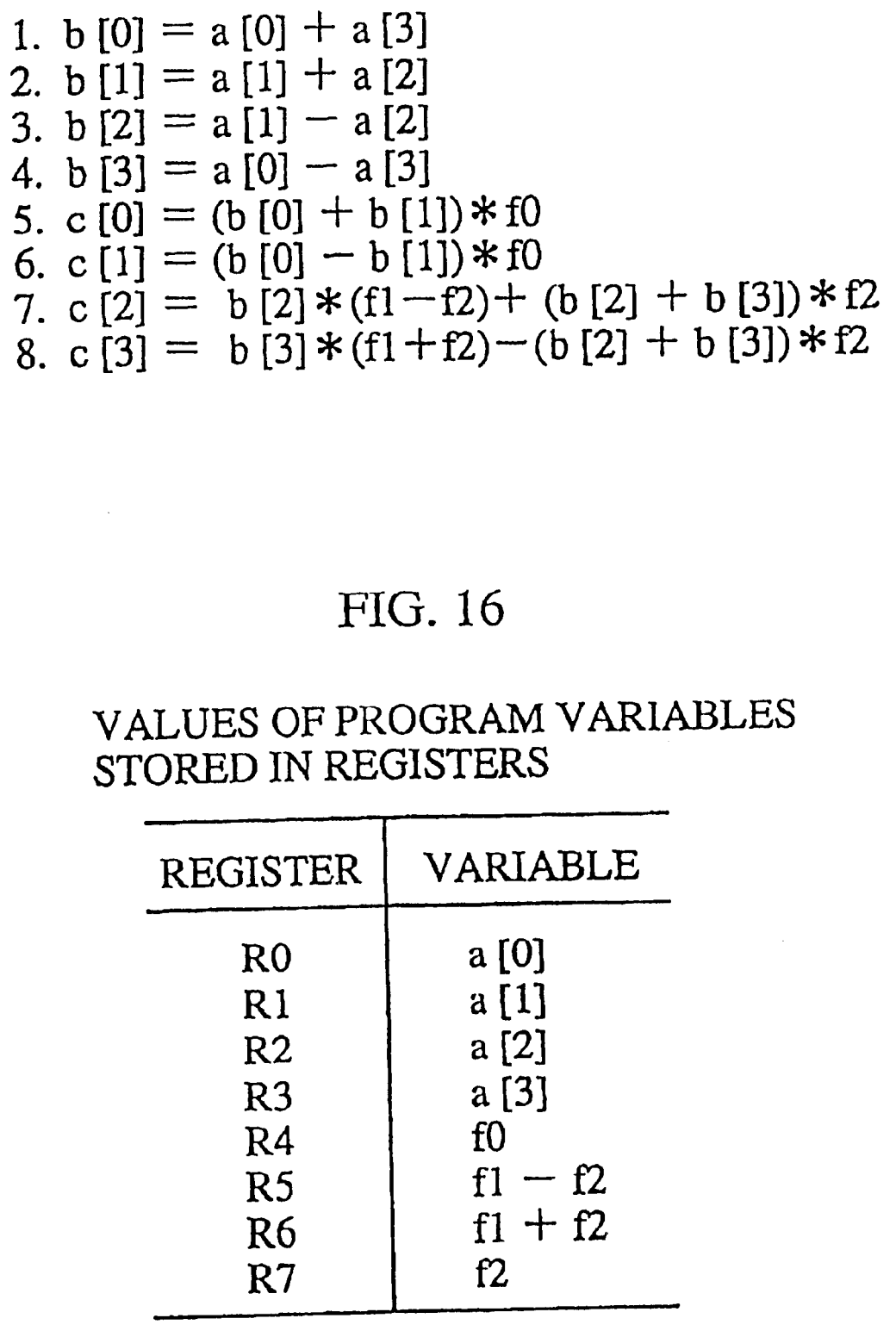

FIG. 15 shows an example of a source program describing a 4×4 discrete cosine transform. Here, a[0] to a[3] represent as-yet unconverted data, c[0] to c[3] converted data and f0 to f2 constants. As shown in FIG. 16, each of the values a[0] to a[3], f0, f1−f2, f1+f2 and f2 is stored in advance in the registers R0 to R7.

FIG. 17 shows an example program composed of long-word instructions for the processor of the present embodiment. This program corresponds to the source program of FIG. 15. The following explains each instruction in the program in order.

First Long-word Instruction
First Slot: 'adsb P2, R1'

This instruction corresponds to the addition and subtraction shown in the second and third lines of the program in FIG. 15. Using this instruction, the processor performs addition and subtraction in parallel on the values a[1] and a[2] stored in registers R1 and R2, The result of the addition b[1] is stored in register R2 and that of the subtraction b[2] in register R1.
Second Slot: 'nop'

There is no instruction which can be performed simultaneously with the instruction of the first slot, so a no operation instruction is inserted.

Second Long-instruction Word
First Slot: 'mov R1, R8'

The processor transfers the value b[2] stored in the register R1 to the register R8.
Second Slot: 'adsb R3, R0'

This instruction corresponds to the addition and subtraction on the first and fourth lines of the program shown in FIG. 15. According to this instruction, the processor performs parallel addition and subtraction on the values a[0] and a[3] stored in registers R0 and R3 The resulting values b[0] and b[3] are stored in registers R3 and R0 respectively.

Third Long-Word Instruction
First Slot: 'mov R0, R9'

In response to this instruction, the processor transfers the value b[3] stored in register R0 to register R9.
Second Slot: 'mul R5, R1'

In response to this instruction, the processor stores the product of the value b[2] stored in register R1. and (f1−f2) stored in register R5 in the register R1.

Fourth Long-Word Instruction
First Slot: 'add R9, R8'

In response to this instruction, the processor stores the sum of the values b[2] stored in register R8 and b[3] stored in the register R9 in register R1.
Second Slot: 'mul R6, R0'

In response to this instruction, the processor stores the product of the value b[3] stored in register RO and (f1+f2) stored in register R6 in register R0.
Fifth Long-Word Instruction First Slot: 'adsb R2, R3'

In response to this instruction, the processor stores the sum and the difference of the values b[0] stored in the register R3 and b[1] stored in the register R2 in the registers R2 and R3 respectively.
Second Slot: 'mul R7, R3'

In response to this instruction, the processor stores the product of the value (b[2]+b[3]) stored in register RB and f2 stored in register R7 in register R8.

Sixth Long-Word Instruction
First slot: 'add R8, R1'

In response to this instruction, the processor stores the sum of the value (b[2]+b[3])*f1−f2)) stored in register R1 and the value ((b[2]+b[3])*f2) stored in register R8, that is the value c[2], in the register R1.
Second Slot: 'mul R4, R2'

In response to this instruction, the processor stores the product of the value (b[0]+b[1])) stored in register R2 and the value f0 stored in register R4, that is the value c[0], in register R2.

Seventh Long-Word Instruction
First Slot: 'sub R8, R0'

In response to this instruction, the processor stores the difference between the value (b[2]*(f1−f2)) stored in register R0 and the value (b[2]+b [3]*f2) stored in register R8, that is the value c[3], in the register R0.
Second Slot: 'mul R4, R3'

In response to this instruction, the processor stores the product of the value (b[0]−b[1]) stored in the register R3 and the value f0 stored in the register R4, that is the value c[1] in the register R3.

Use of the 'adsb' instruction enables processing to take place efficiently, as the program example shown above demonstrates. Here, the processor can execute the 'adsb' instruction and the 'mul' instruction simultaneously, as in the fifth long-word instruction, so that product-sum calculations can be executed efficiently as shown in this program. In actual image compression processing, a number of product-sum calculations need to be performed for each image block, so that very many product-sum calculations are performed for each frame. Thus, use of the 'adsb' instruction can greatly increase the processing rate.

FIG. 18 shows a program used by a conventional processor, having two instruction slots, which does not use the 'adsb' instruction. This program sequence also corresponds to the source program in FIG. 15. From this it can be seen that a conventional processor needs ten long-word instructions to operate the program, while the processor in the present invention requires only seven.

Here, the add-subtract instruction can be placed in either the first or second slot, but a construction in which an addsubtract instruction can be placed in only one of the two slots may alternatively be used. For example, the processor shown in FIG. 2 can be constructed without the selector 107. In this case, an 'adsb' instruction can only be placed in the first slot.

While each register in the above explanation stores one piece of data, each register may be divided, for example, into an upper and lower field. These fields store two pieces of data sequentially, with each taking up half of the register width. This is known as SIMD (Single Instruction Multiple Data) format. In this case, add instructions, subtract instructions, add-subtract instructions and multiply instructions may be executed by performing the required calculation on values stored in either the upper or the lower fields of two registers. The result of the calculation is stored in the original field in one of the registers. For an 'adsb' instruction, the content of the two registers can be switched, as shown in the present embodiment. Registers may of course be divided into three or more fields using SIMD format.

Furthermore, the processor in the present embodiment is a VLIW processor, but a superscalar processor may also be used. In this case, the processor includes a retrieving unit, which retrieves two instructions that can be executed simultaneously from a serial instruction sequence. The two retrieved instructions are stored in the first and second slots and executed by execution units 102 and 103.

The number of instructions executed in parallel in the present embodiment is two, but it may alternatively be three or more.

Program Conversion Apparatus

Figure 19:
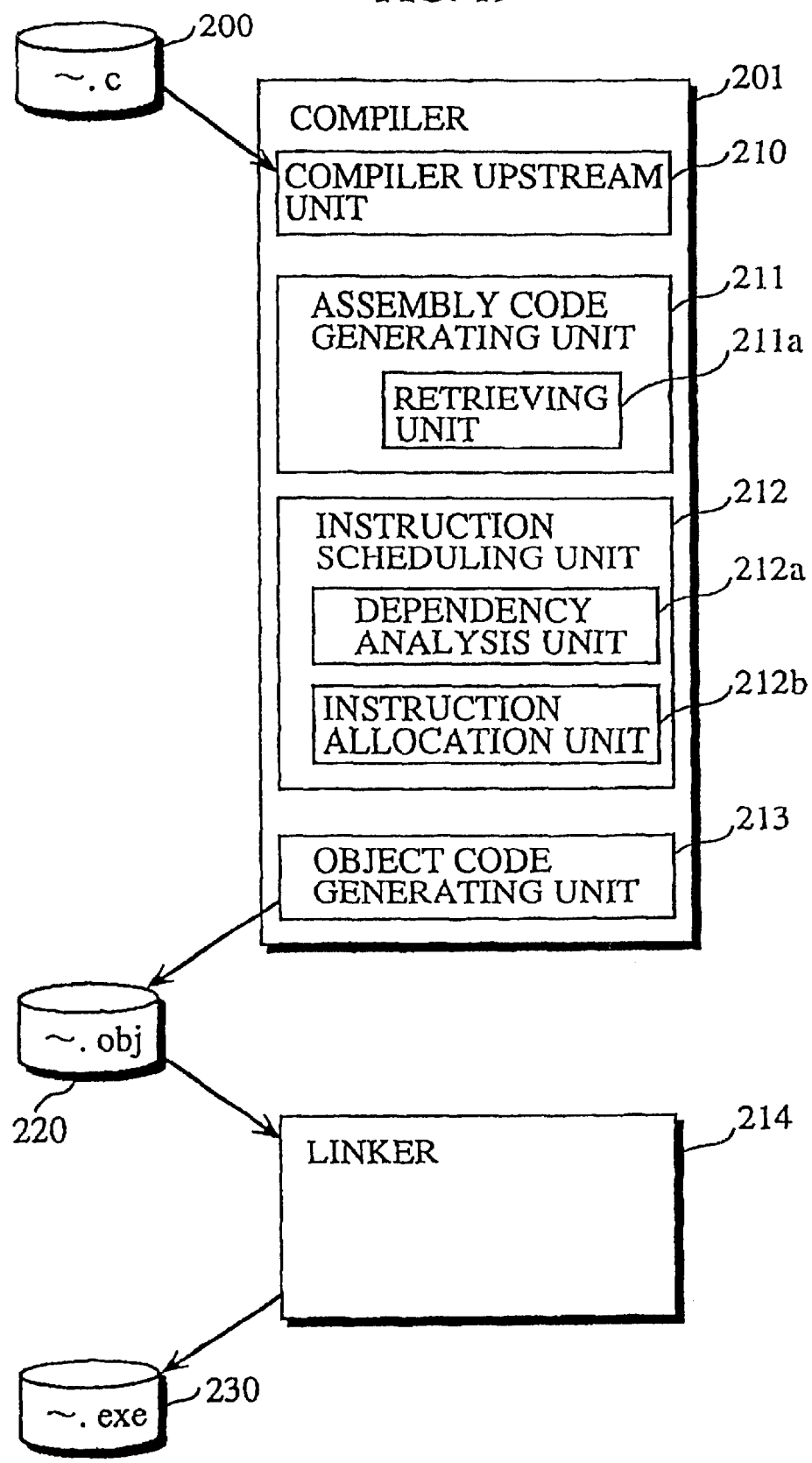
FIG. 19 is a block diagram showing a structure for a program conversion apparatus, which converts a source program into a program (execution code) for use by the processor of the present invention.

FIG. 19 is a block diagram showing the structure of a program conversion apparatus, which converts a source program into a program (execution codes) for the processor shown in FIG. 2. This program conversion apparatus is realized by executing software describing each of the functions shown in FIG. 19 on hardware such as a conventional workstation or personal computer.

A program conversion apparatus shown in FIG. 19 includes a compiler 201 and a link editing unit 214. The compiler 201 has a compiler upstream unit 210, an assembly code generating unit 211, an instruction scheduling unit 212 and an object code generating unit 213. The compiler 201 converts a source program 200 stored on hard disk into an object program 220.

The compiler upstream unit 210 reads the source program 200 from the hard disk and performs syntactic and semantic analysis on the read source program. The compiler upstream unit 210 then generates an intermediate program composed of internal format codes (hereafter referred to as 'intermediate codes') from the results of this analysis.

The assembly code generating unit 211, having a retrieving unit 211a, generates an assembly program composed of assembly codes (instructions written in mnemonic format) from the intermediate program generated by the compiler upstream unit 210.

In order to generate an assembly program, the retrieving unit 211a retrieves an intermediate code indicating an addition of two variables and an intermediate code indicating a subtraction of the same two variables from the intermediate program. The assembly code generating unit 211 generates an 'adsb Rn, Rm' instruction for the pair of intermediate codes retrieved by the retrieving unit 211a.

For convenience's sake, the source program shown in FIG. 15 is treated as an intermediate program. First, the retrieving unit 211a retrieves variables for an intermediate code denoting addition (for example the intermediate code on the first line) from the intermediate program. Furthermore, by retrieving an intermediate code, which performs subtraction using the same variables (the intermediate code of the fourth line), the retrieving unit 211a retrieves a pair of intermediate codes, ie those of the first and fourth lines. The retrieving unit 211a performs the above processing for each intermediate code denoting addition. As a result, in FIG. 15 three pairs, the first and fourth lines, the second and third lines and the seventh and eighth lines, are retrieved. The assembly code generating unit 211 generates an 'adsb' instruction for each pair.

The instruction scheduling unit 212, having a dependency analysis unit 212a and an instruction allocation unit 212b, arranges the assembly codes within the assembly program in parallel according to the specification of the target processor. In the present embodiment, the processor of FIG. 2 is the target, so the instruction scheduling unit 212 arranges two instructions in parallel. Here, if two instructions with the required dependency are not available, the instruction scheduling unit 212 inserts a 'nop' instruction. The dependency analysis unit 212a analyzes the dependency of instructions in the assembly program generated by the assembly code generating unit 211, Here, instruction dependency is divided into three kinds: data dependency, reverse dependency and output dependency. Data dependency is the dependency of an instruction referring to a certain resource (register or memory) on an instruction defining the same resource. Reverse dependency is the dependency of an instruction that defines a certain resource on an instruction that refers to the same resource. Output dependency is the dependency of an instruction that defines a certain resource on another instruction that also defines that resource. If the execution order of a pair of dependent instructions is switched, an error will occur in the program, so it is vital to preserve the original execution order of such instructions.

The instruction allocation unit 212b, following the result of analysis by the dependence unit 212a, arranges two nondependent instructions in parallel as a long-word instruction. In doing so, the instruction allocation unit 212b retrieves a non-dependent multiply ('mul') or transfer ('mov') instruction for each 'adsb' instruction in the assembly program. On retrieving a multiply instruction, the instruction allocation unit 212b assigns the 'adsb' instruction to the first slot and the 'mul' instruction to the second slot in parallel. On retrieving a transfer instruction, the instruction allocation unit 212b assigns the transfer instruction to the first slot and the 'adsb' instruction to the second slot in parallel. If a 'mul' instruction or 'mov' instruction which is not dependent on an 'adsb' instruction does not exist, the instruction allocation unit 212b places a 'nop' instruction and an 'adsb' instruction in parallel.

The object code generating unit 213 generates the object program 220, which is composed of machine language instruction codes, from the assembly program arranged in parallel by the instruction scheduling unit 212. That is, each assembly code in the assembly program that has been placed in parallel is converted into a machine language instruction code.

A linker 214 generates an executable program 230 by joining the object program generated by the object code generating unit 213 with another object program. The program sequence of long-word instructions shown in FIG. 17 is an example of an execution format program. It should be noted, however, that this drawing uses mnemonic notation.

The program conversion apparatus in the above embodiment converts an add instruction and subtract instruction for the same two operands into one 'adsb' instruction Furthermore, 'adsb' instructions are arranged in parallel with 'mov' or 'mul' instructions. As a result, the program conversion apparatus can generate long-word instructions sequences suitable for a processor like the one in FIG. 2.

Here, in the above program conversion apparatus, the retrieving unit 211a retrieves pairs of intermediate codes from the intermediate program, each pair including intermediate codes for an addition and a subtraction. However, as an alternative, a pair of source codes indicating an addition and a subtraction may be retrieved from the source program. In this case, a construction in which the compiler upstream unit 210 generates intermediate codes, indicating addition and subtraction, from the retrieved pair of source codes is used.

As a further alternative, the retrieving unit 211a may retrieve an add and subtract instruction pair from the object program. In this case, a construction in which the retrieved pair is replaced with an 'adsb' instruction by the assembly code generating unit 211 or the instruction scheduling unit 212 is used.

It should be noted that the target processor may also be a modified version of the one in FIG. 2. For example, if a construction in which an 'adab' instruction can only be placed in one of the slots, or in which three or more instructions are arranged in parallel is used, instructions may be suitably arranged in parallel by the instruction allocation unit 212b.

Although the present invention has been fully described by way of examples with reference to accompanying drawings it is to be noted that various changes and modifications will be apparent to those skilled in the art. Therefore, unless such changes and modifications depart from the scope of the present invention, they should be construed as being included therein.

What is claimed is:

1. A processor, having a plurality of instruction slots each of which stores an instruction to be executed in parallel, wherein one of the plurality of instruction slots is a first instruction slot and another one of the plurality of instruction slots is a second instruction slot, the processor comprising:
    a special instruction stored in the first instruction slot denoting a first-type calculation and a second-type calculation simultaneously, the first-type calculation and the second-type calculation being executed by a first functional unit that executes instructions stored in the first instruction slot and a second functional unit that executes instructions stored in the second instruction slot, while an instruction in the second instruction slot is executed by a third functional unit that executes instructions stored in the second instruction slot.

2. The processor of claim 1, wherein:
    the special instruction denotes addition and subtraction, and
    one of the first and second functional units performs addition and the other subtraction, as denoted by the special instruction.

3. The processor of claim 2, wherein the instruction is a multiply instruction, and the third functional unit is a multiplier.

4. A processor for executing a plurality of instructions in parallel, comprising:
    an instruction register having at least first and second instruction slots, for storing the plurality of instructions;
    first and second decoders, for respectively decoding the instructions stored in the first and second instruction slots;
    first and second functional units, which, if a special instruction that denotes a first-type calculation and a second-type calculation simultaneously is decoded by the first decoder, together execute the special instruction under the control of the first decoder, the first and second functional units respectively executing the first-type calculation and the second-type calculation; and
    a third functional unit, for executing an instruction in parallel with the execution of the special instruction, under the control of the second decoder.

5. The processor of claim 4, wherein:
    the special instruction denotes addition and subtraction, and
    one of the first and second functional units performs addition and the other subtraction, as denoted by the special instruction.

6. The processor of claim 5, wherein the instruction is a multiply instruction, and the third functional unit is a multiplier.

7. A processor, for executing a plurality of instructions in parallel, comprising:
    a first and second decoding means, each of which decodes instructions and generates decode results denoting the content of the instructions, wherein, if the first decoding means decodes a special instruction, the first decoding means generates a firstpart decode result denoting a first-type calculation and a second-part decode result denoting a second-type calculation;
    a first and second executing means, corresponding to each of the first and second decoding means, for executing instructions in parallel according to a decode result from the first and second decoding means respectively; and
    a selecting means, for selecting the second-part decode result if the first decoding means decodes the special instruction, and selecting the decode result from the second decoding means if the first decoding means decodes an instruction other than the special instruction,
    wherein the second executing means includes:
        a first functional unit, which executes instructions according to the decode result selected by the selecting means; and
        a second functional unit, which executes instructions according to the decode result of the second decoding means, and wherein, if the special instruction is decoded, the first executing means performs a first-type calculation, and, in the second executing means, the fast functional unit performs a second-type calculation and the second functional unit executes an instruction other than a special instruction, decoded by the second decoding means.

8. The processor of claim 7, wherein:
    the special instruction includes an operation code denoting the first-type calculation and the second-type calculation, and first and second operands;
    the first executing means performs the first-type calculation on the first and second operands, and stores a calculation result in the first operand;

the second executing means performs the second-type calculation on the first and second operands, and stores a calculation result in the second operand.

9. The processor of claim 8, wherein:

the first executing means includes an adder/subtracter;

the first functional unit is an adder/subtracter; and the special instruction denotes addition as the first-type calculation and subtraction as the second-type calculation.

10. The processor of claim 9, wherein the second functional unit is a multiplier and the instruction is a multiply instruction.

11. The processor of claim 9, wherein the second functional unit is a data transfer unit and the instruction is a transfer instruction.

12. A processor that fetches long-word instructions, each comprising at least two instructions, from a program, and executes a plurality of instructions in parallel, wherein the program includes special instructions for indicating a first-type calculation and a second-type calculation, the processor comprising;

an instruction register having first and second instruction slots, for storing each of the instructions in a long-word instruction;

a first decoding means, for decoding an instruction stored in the first slot, and if the instruction is a special instruction, generating a first decode result and a second decode result;

a first executing means, for executing an instruction in accordance with the first decode result;

a second decoding means, for decoding an instruction stored in the second slot and generating a third decode result in parallel with the decoding and generating performed by the first decoding means;

a selecting means, for selecting the second decode result if the special instruction is decoded by the first decoding means, and selecting the third decode result if an instruction other than a special instruction is decoded by the first decoding means; and a second executing means, for executing an instruction according to the decode result selected by the selecting means, wherein the first executing means performs the first-type calculation if the special instruction is decoded by the first decoding means; and the second executing means performs the second-type calculation if the second decode result is selected by the selecting means.

13. The processor of claim 12, wherein:

the special instruction includes an operation code denoting the first-type calculation and the second-type calculation, and first and second operands;

the first executing means performs the first-type calculation on the first and second operands, and stores a calculation result in the destination indicated by the first operand;

the second executing means performs the second-type calculation on the first and second operands, and stores a calculation result in the destination indicated by the second operand.

14. The processor of claim 13, wherein the second executing means includes:

a first functional unit, which executes an instruction according to a decode result selected by the selecting means; and a second functional unit, which executes an instruction according to the third decode result of the second decoding means, wherein the first functional unit performs the second-type calculation according to the special instruction, and the second functional unit executes an instruction other than a special instruction in parallel with the special instruction according to the third decode result.

15. The processor of claim 14, wherein:

the first executing means includes an adder/subtracter;

the first functional unit is an adder/subtracter; and the special instruction denotes addition as the first-type calculation and subtraction as the second-type calculation.

16. The processor of claim 15, wherein the second functional unit is a multiplier and the instruction is a multiply instruction.

17. The processor of claim 15, wherein the second functional unit is a data transfer unit and the instruction is a transfer instruction.

* * * * *